Sept. 23, 1947.  G. FREDRICKSON  2,427,774
METHOD AND APPARATUS FOR MAGNETICALLY TESTING
THE HARDNESS OF PARAMAGNETIC OBJECTS
Filed Oct. 9, 1943  2 Sheets-Sheet 1

INVENTOR:
GUSTAV FREDRICKSON
BY Romeyn A. Spare
HIS ATTORNEY

Sept. 23, 1947. G. FREDRICKSON 2,427,774
METHOD AND APPARATUS FOR MAGNETICALLY TESTING
THE HARDNESS OF PARAMAGNETIC OBJECTS
Filed Oct. 9, 1943 2 Sheets-Sheet 2

INVENTOR:
GUSTAV FREDRICKSON.
BY Romeyn J. Spare
HIS ATTORNEY

Patented Sept. 23, 1947

2,427,774

UNITED STATES PATENT OFFICE 2,427,774

METHOD AND APPARATUS FOR MAGNETICALLY TESTING THE HARDNESS OF PARAMAGNETIC OBJECTS

Gustav Fredrickson, Bristol, Conn., assignor to General Motors Corporation, Detroit, Mich., a corporation of Delaware Application October 9, 1943, Serial No. 505,660

5 Claims. (Cl. 209—215)

1

This invention relates to a method of and apparatus for magnetically testing the hardness of magnetizable objects and comprises all of the features of novelty disclosed.

In steel and other materials which may be hardened by heating to a temperature above the critical range followed by quenching and drawing operations, variations in the times and/or temperatures of the heating, quenching and drawing operations affects the grain structure and the resultant hardness of the material. Similar precision work pieces such as the race rings of antifriction bearings should be hardened within very close limits of accuracy, and a slight variation of the heat treatment or a slight variation of the composition of the work piece is often sufficient to cause an unsatisfactory hardness of the work piece.

Heretofore, it has been common practice to physically test for hardness with a scleroscope by measuring the rebound of a hardened point from a finished work surface. It has also been usual practice to perform a Rockwell hardness test by measuring the size of the impression made by indenting a hardened conical test point into a finished work surface under a predetermined pressure.

These tests which only indicate surface conditions of the work piece, are much too slow under conditions of mass production, and are usually destructive to precision finished work pieces such as the race rings of antifriction bearings. Hence, it has only been practicable to test occasional work pieces taken at random from a production line.

I have found that in practice the magnetic properties of objects made from steel and other paramagnetic materials which may be hardened by heat treatment, have a definite relation to the hardness and other physical properties of the para-magnetic material.

An object of my invention is to provide an improved method and apparatus responsive to residual magnetism for indicating undesirable physical properties in para-magnetic bodies.

Another object is to provide an improved method and apparatus for magnetically sorting similar paramagnetic bodies in accordance with the residual magnetism in these bodies to determine their hardness.

A further object is to provide an improved method and apparatus for rapidly sorting and testing all of the para-magnetic bodies in a production line in accordance with their residual magnetism to determine the hardness of these bodies.

To these ends and also to improve generally upon devices of this character, the invention consists in the various methods hereinafter described and claimed. In its broader aspects, the invention is not necessarily limited to the specific construction and method steps illustrated in the accompanying drawings in which Fig. 1 is the plan view of my apparatus;

Generally considered, my method and apparatus is for rapidly testing and sorting a large number of work pieces, as the similar steel antifriction bearing race rings W in a production line. These work pieces are successively subjected to a magnetic field sufficient to produce an initial magnetic saturation and then they are subjected to a predetermined demagnetizing field to partially demagnetize each work piece after which the resultant residual magnetism in each work piece is measured to determine the hardness of the work piece, the measurement being by comparison of the residual magnetism of the work piece with that of a standard work piece of known hardness. As will appear, this comparison also is affected by undesirable grain structure of the material. I also employ this residual magnetism for magnetically sorting these work pieces by comparison with the residual magnetism of a standard work piece of known hardness and subjected to the same magnetizing and demagnetizing steps. In work pieces such as the hardened steel race rings of antifriction bearings, the life of the antifriction bearings is largely dependent upon the hardening of these race rings within very close limits of a required standard. I have found that the residual magnetism produced in work pieces by my apparatus and in accordance with my method varies with the hardness of the work piece, and this variation is critical in the range of hardness which includes the desired hardness for race rings of antifriction bearings.

Figure 3:
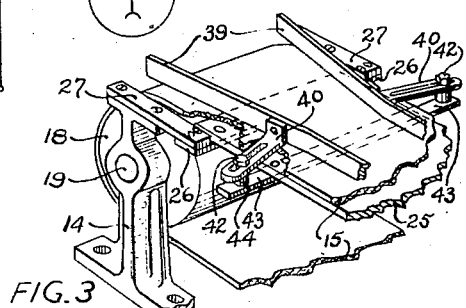
Fig. 3 is a fragmentary perspective view showing the belt mounting and associated parts at the work loading end of my apparatus.

Referring to the illustrated embodiment of my invention, a pair of spaced pedestal bearings 10 are secured to the upper ends of laterally spaced longitudinal sloping rails 11 at the top of a frame 12, and a similar pair of spaced pedestal bearings 14 are secured upon the lower ends of these rails. A conveyor 15, as a flexible belt composed of leather or other suitable non-magnetizable material, is driven by a driving pulley 16 secured to a shaft 17 journalled in the pedestal bearings 10, the belt running around a pulley 18 mounted on a shaft 19 supported by the pedestal bearings 14. This belt may be driven at desired controlled speeds by a motor-driven adjustable speed reduction unit 21 which rotates a sprocket 22 that is connected by a chain 23 to drive a sprocket 24 secured to the shaft 17. The top run of the belt is prevented from sagging and is slidably supported in a plane by a flat non-magnetizable plate 25 which extends substantially the entire distance between the top portions of the pulleys 16 and 18. Each end of the plate 25 is mounted on a cross bar 26 fastened at its ends to arms 27 secured on the upper ends of the pedestal bearings as shown in Figure 3. A pair of spaced work receiving solenoids 30 and 31, which surround the upper run of the belt 15 in spaced relation, are supported by brackets 32 mounted on the rails 11, and shoulders on these brackets co-operatively support intermediate portions of the plate 25. The bottom belt run is carried on spaced rollers 33 which are rotatably carried by shafts mounted in bearings secured to the rails 11.

A bracket 34, secured to the lower end of the frame 12, has a work-supporting bed 35 extending closely to the belt 15, and work pieces W may be slid from this bed onto the lower end of the top belt run. If desired, a rail may be provided part way around the supporting bed to prevent the work piece from falling off the bed. The upwardly moving belt 15 carries the work pieces through the solenoids 30 and 31 and through a testing solenoid 36 at the upper end of the belt run after which the work pieces are ejected through guides onto the sloping flat upper face of a rotated sorting disc 37 that sorts these work pieces into bins $B^1$ and $B^2$ in accordance with the hardness of the work as will be later described.

Figure 5:
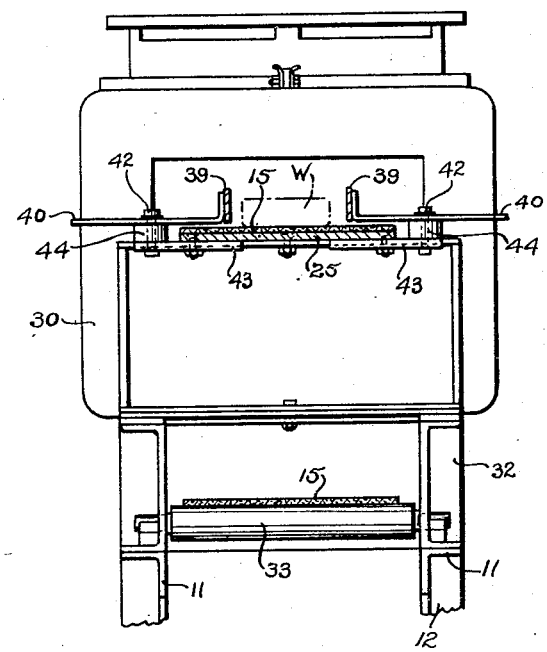
Fig. 5 is an enlarged cross section taken along the lines 5—5 of Fig. 1.
Figure 7:
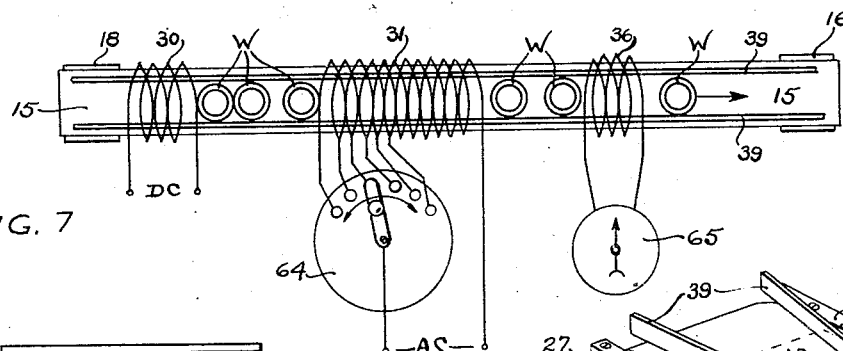
Fig. 7 is a schematic diagram.
Figure 6:
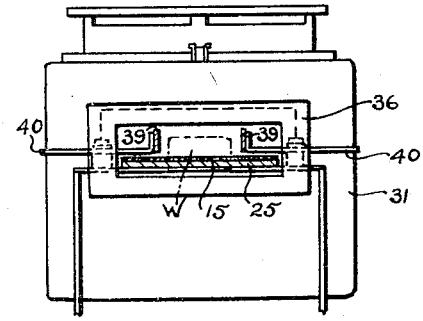
Fig. 6 is an enlarged cross section taken along the line 6—6 of Fig. 1.

A pair of laterally spaced work guiding strips 39, composed of suitable non-magnetizable material, extend the length of the top belt run just above the belt. As best illustrated in Figures 3 and 5, these work guiding strips are supported for lateral adjustment by angle brackets 40 provided with slotted arms through which pass adjustable clamping studs 42 that are threaded in the ends of cross bars 43 secured to the underside of the plate 25. The brackets 40 are supported on spacer sleeves 44 receiving the studs 42 and these brackets are regulated to adjustably space the strips 39 slightly in excess of the work piece diameter so that the belt 15 will carry the work pieces in a straight path without rotation and in the same polar relation through the solenoids. I preferably divergently spread the lower ends of the work guide ends 39 to provide a convenient entering throat for the work pieces as they are slid onto the belt from the bed 35. Brackets on the upper end of the frame 12 angularly and adjustably support an inclined work receiving plate 45 in closely spaced relation to the upper end of the top belt run and slightly above the adjacent edge of the sorting disc 37. Guide strips 46 secured in adjustably spaced relation on the plate 45 and having curved portions overlying the sorting disc 37, co-operate with the work guide strips 39 so that the work pieces W leaving the belt and sliding down over the plate 45 are laterally directed onto the sorting disc in the general direction of the disc rotation.

Figure 1:
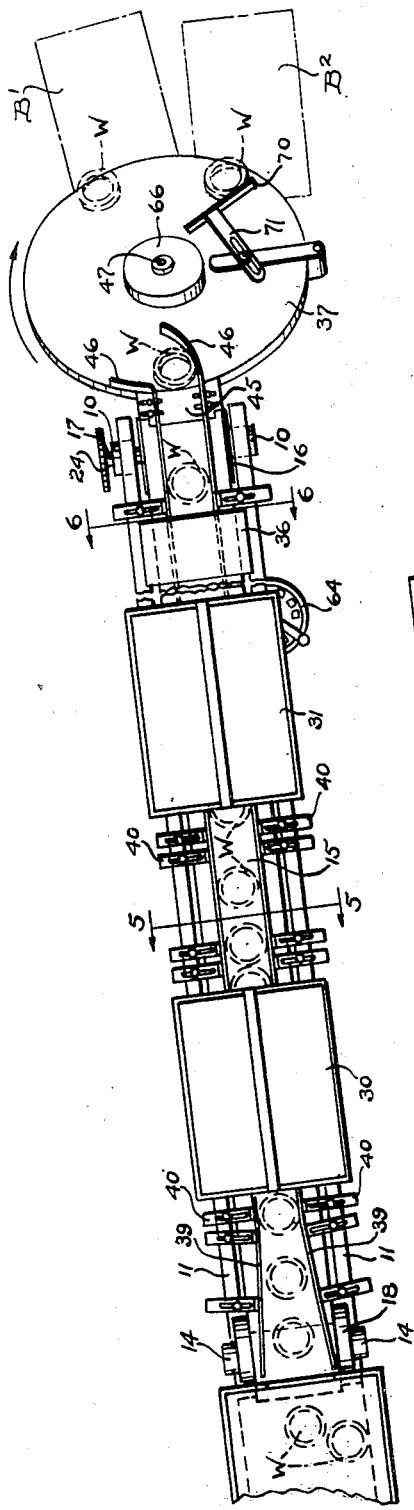
Figure 2:
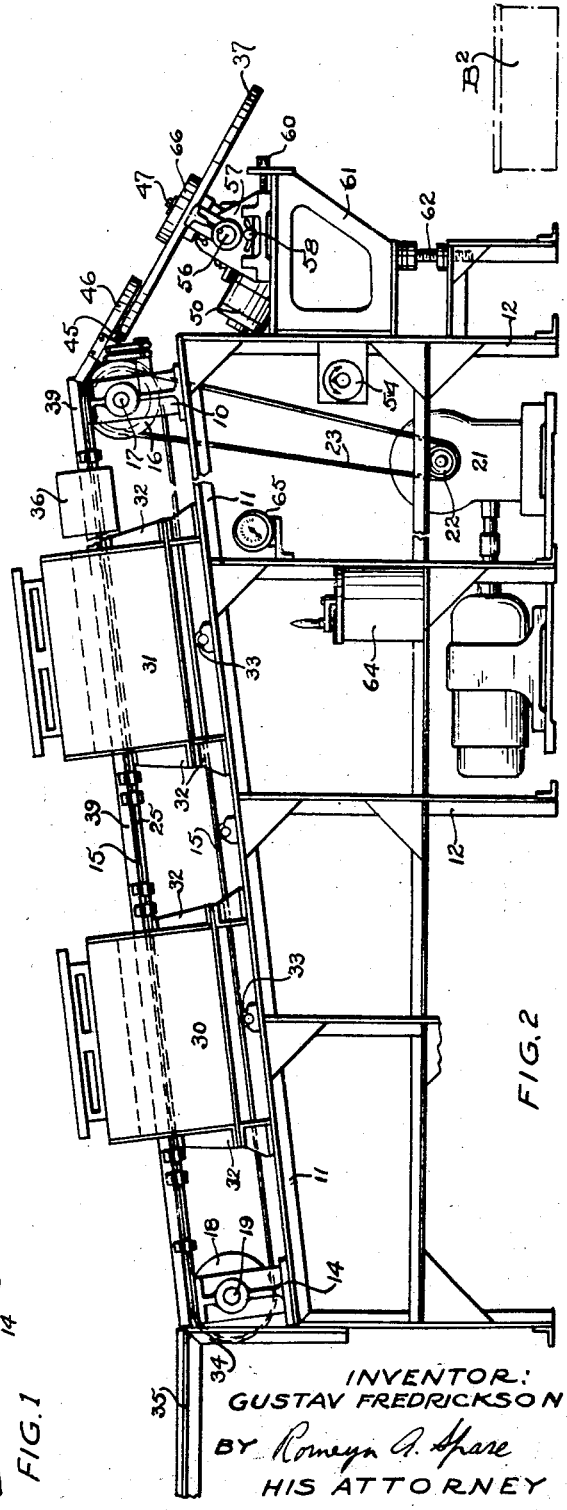
Fig. 2 is a side elevation.
Figure 4:
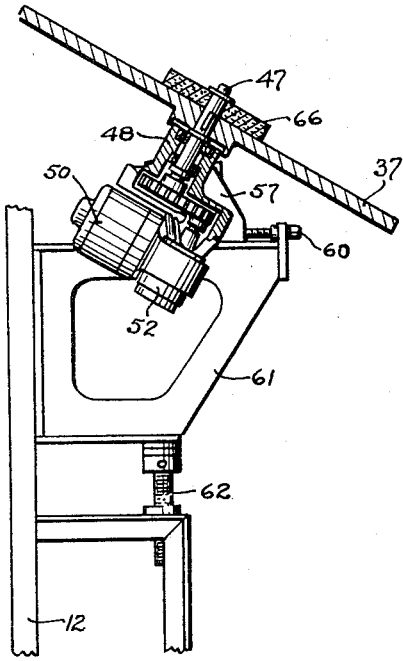
Fig. 4 is an enlarged fragmentary view of the sorting disc with its positioning and driving mechanism.

The rotatable disc 37 which is composed of soft iron or other paramagnetic material that will not retain residual magnetism is connected to the upper end of a shaft 47 rotatably supported by bearings in a housing 48. A motor 50, at the lower end of this housing, acts through a reduction unit 52 and through gears to drive the shaft 47. This motor is controlled by a rheostat 54 (Fig. 2) to regulate the speed of rotation of the sorting disc 37. Trunnions 56, laterally projecting from the housing 48 and journalled in a casing 57, provide for tilting the sorting disc to the required angle and a screw 58, threaded in the housing and passing through an arcuate slot in the casing secures the sorting disc in its angularly adjusted position. The casing 57 is slidably positioned by a screw 60 for adjustment towards and from the frame 12 on a support 61, and the support 61 may be slidably raised and lowered on the frame 12 by a feed screw 62.

The solenoid 30, which is energized by direct current, is of such size and produces sufficient magnetic field so that the hardened work pieces W fed therethrough will be initially saturated with magnetism. The solenoid 31, which is energized by alternating current, produces a subsequent demagnetizing influence that is regulated by a controller 64 to connect selected portions of the solenoid 31 in circuit so that a correctly hardened work piece W will only be partially demagnetized as it emerges from the solenoid 31. The solenoid 36 is connected to a sensitive meter 65 which registers the current induced in the solenoid by each magnetized work piece W passing therethrough at a fixed speed. The solenoid 36 is preferably short enough so that the spaced belt-carried work pieces W will pass therethrough one at a time. The hardness of the work piece may be determined by comparing this meter reading with the meter reading resulting from the passage of a standard work piece of required hardness and of required fine grained structure through the solenoids 30, 31 and 36 under the same conditions of test. The heat treating time of a work piece may be carried slightly beyond the time required for producing a perfect work piece as to hardness without reducing the hardness of this work piece below an acceptable limit, but that same overtime of heat treatment will change the desired fine grain structure into an unacceptable coarse grain structure. A work piece with this coarse grained structure cannot retain as much magnetism as a similar work piece of corresponding hardness and having the required fine grained structure. Hence, the reduced magnetism of a coarse grained work piece will also be indicated on the meter 65.

The work pieces tend to cling together as a group within the field of the energized solenoid 30 and to form an unbroken column. Accordingly, I preferably feed the work pieces in spaced relation to each other onto the top belt run so that each belt-fed work piece will strike against the lower end of this column of abutting work pieces within this solenoid and cause the work piece emerging from the upper end of this solenoid to break free from its clinging relation and travel upwardly with the belt through the succeeding solenoids in spaced relation to the other belt-carried work pieces.

The controller 64 is initially adjusted so that work pieces substantially below the desired acceptable hardness or of undesirable grain structure will have only a small amount of residual magnetism upon emerging from the solenoid 31. The sorting disc 37 is then adjusted as to tilt and speed of rotation so that work pieces below the acceptable hardness and/or of objectionable coarse-grained structure will be thrown off of this disc into a bin B′ as these work pieces approach the lowermost portion of the disc. A collar 66 of non-magnetic material, mounted on the shaft 47 and over the center of the disc 37, prevents the work pieces W from locating on the central zone of this disc where the centrifugal force of disc rotation would be ineffective to aid in the sorting operation. Work pieces of acceptable hardness and of acceptable fine grained structure retain more magnetism and cling to the disc until an arm 70 of an adjustably positioned bracket 71, overlying the disc, directs these work pieces into a bin B². After adjustment of tilt and speed of disc rotation, further critical adjustment of the desired point of hardness below which work pieces are to be discarded into the bin B′ is obtained by further regulation of the controller 64. If desired, the tested work pieces may be subjected to a standard demagnetizing operation to remove residual magnetism.

I claim:

1. The method of determining the hardness of a magnetizable object, comprising the steps of transporting the object at a predetermined rate of speed successively through a magnetizing field to saturate said object with magnetism and then through a demagnetizing field of predetermined strength to reduce said magnetism, and thereafter testing the ability of said object to magnetically cling to a non-magnetized paramagnetic member while applying against said object a predetermined centrifugal force which tends to slide the object off of the paramagnetic member.

2. A method for sorting magnetizable objects in accordance with their hardness, comprising the steps of saturating each object with magnetism, subjecting the object to a demagnetizing field of controllable strength to reduce the magnetism in said object, and selectively delivering the object from a rotated paramagnetic member to one of a plurality of stations as determined by the effect of the centrifugal force of the rotated paramagnetic member upon the magnetic clinging ability of the object to said paramagnetic member.

3. In a device for sorting magnetizable work pieces in accordance with their hardness, a solenoid having a magnetizing field of predetermined strength, a solenoid having a demagnetizing field of predetermined strength, a rotatable disc of non-magnetized paramagnetic material, means to rotate said disc at a controlled speed, and conveyor mechanism for transporting magnetizable work pieces through the solenoids and onto said disc whereby work pieces will be discharged at different positions from said disc in accordance with the residual magnetism present in said work pieces.

4. In a device for sorting magnetizable work pieces in accordance with their hardness, a solenoid having a magnetizing field of predetermined strength, a second solenoid having a demagnetizing field of predetermined strength, a conveyor for transporting work pieces successively through the solenoids, a paramagnetic rotatable disc for receiving the magnetized work pieces from said conveyor, and disc regulating means for causing the disc-supported work pieces to be subjected to controlled forces which at least partially reduce the magnetic clinging effect of the work pieces to said disc.

5. In a device for sorting magnetizable work pieces in accordance with their hardness, a pair of spaced solenoids respectively provided with a magnetizing field and a demagnetizing field of predetermined strengths, a conveyor for transporting work pieces successively through the magnetizing and the demagnetizing fields, a rotatable paramagnetic disc free of residual magnetism and arranged to receive the magnetized work pieces from said conveyor, means to tiltably adjust said disc, and means to regulate the strength of the demagnetizing field, whereby work pieces will be magnetically sorted by the disc in accordance with their magnetic clinging ability to said disc.

GUSTAV FREDRICKSON.

REFERENCES CITED

The following references are of record in the file of this patent:

UNITED STATES PATENTS

| Number | Name | Date |
| --- | --- | --- |
| Re. 21,927 | Brace et al. | Oct. 21, 1941 |
| 2,292,489 | Stibitz | Aug. 11, 1942 |
| 2,302,128 | Lakatoes | Nov. 17, 1942 |
| 1,103,358 | Hess | July 14, 1914 |
| 1,663,539 | Bellinger | Mar. 27, 1928 |
| 1,983,388 | Moore | Dec. 4, 1934 |
| 1,296,932 | Dodge | Mar. 11, 1919 |
| 1,890,950 | Sharp | Dec. 13, 1932 |
| 1,477,847 | Palmer | Dec. 12, 1923 |
| 2,285,274 | Hanson et al. | June 2, 1942 |
| 2,218,784 | Billstein | Oct. 22, 1940 |

FOREIGN PATENTS

| Number | Country | Date |
| --- | --- | --- |
| 267,200 | Germany | Nov. 13, 1913 |
| 299,388 | Great Britain | Aug. 8, 1929 |

OTHER REFERENCES

Spooner on "Properties and Testing of Magnetic Materials," published by McGraw-Hill Book Co., New York. See pages 68–69. (Copy found in Division 48 of this Office.)